INVENTOR
J. A. BURTON
BY R. J. Guenther
ATTORNEY

Dec. 18, 1956 J. A. BURTON 2,774,695

PROCESS OF FABRICATING GERMANIUM SINGLE CRYSTALS

Filed Feb. 27, 1953 2 Sheets-Sheet 2

INVENTOR
J. A. BURTON
BY [signature]
ATTORNEY

United States Patent Office 2,774,695

Patented Dec. 18, 1956

2,774,695

PROCESS OF FABRICATING GERMANIUM SINGLE CRYSTALS

Joseph A. Burton, Chatham, N. J., assignor to Bell Telephone Laboratories, Incorporated, New York, N. Y., a corporation of New York Application February 27, 1953, Serial No. 339,304

2 Claims. (Cl. 148—1.5)

This invention relates to semiconductor signal translating devices and more particularly to the preparation of germanium for use in such devices.

Germanium presently is used in a variety of translators such as rectifiers, transistors and photocells. Two of the the parameters of any germanium material, of principal moment from the standpoint of the performance characteristics of the device in which it is employed, are the resistivity and lifetimes of the injected carriers, i. e., of holes and electrons. In some devices, uniform carrier lifetimes throughout the bulk of the germanium are advantageous. In others, for example, such as disclosed in the applications Serial No. 276,511, filed March 14, 1952, and Serial No. 317,884, filed October 31, 1952, of W. Shockley, it is advantageous that a portion of the germanium body exhibit a substantially shorter carrier lifetime than adjacent portions. Theoretically at least, a germanium translating device could be tailored, in effect, to have certain prescribed performance characteristics by controlling the resistivity or lifetime or both of the germanium material. However, heretofore such tailoring has not been practical for the reason, inter alia, that treatment of the material to control or alter the carrier lifetimes has resulted in a marked and usually undesirable change in the resistivity.

One general object of this invention is to enable and facilitate the control of carrier lifetimes in germanium material for use in signal translating devices, and thereby to expedite the fabrication of devices having prescribed characteristics.

The invention is predicated in part upon the discovery that nickel when added to germanium of either N or P conductivity type effects a decrease in the carrier lifetime for the material and that the effect is controllable and reproducible. More particularly, it has been found that the addition of nickel to N or P type germanium having resistivity within a broad range can be controlled to produce a change of preassigned magnitude in the carrier lifetimes without substantial alteration in the resistivity.

Thus, one feature of this invention resides in the addition of particular amounts of essentially pure nickel to germanium to produce a material of preassigned resistivity and carrier lifetimes.

The invention and the above-noted and other features thereof will be understood more clearly and fully from the following detailed description with reference to the accompanying drawing in which.

Germanium material in accordance with this invention may be prepared utilizing the general method described in the application Serial No. 168,184, filed June 15, 1950, of G. K. Teal, now Patent No. 2,727,840, issued December 20, 1955. In this method, in brief, a mass of germanium of either conductivity type is melted in a suitable crucible and a seed crystal of germanium is partially immersed in the molten mass and then withdrawn at a rate to draw some of the molten material along therewith. The withdrawn material is allowed to cool slowly and solidifies as a single crystal with its crystalline axes oriented in the same relation as those in the seed. During the withdrawal step, an impurity, for example in the form of a pellet or powder of the impurity alone or of an alloy of germanium and the impurity, is dropped into the molten mass thereby to control, for example, the resistivity or conductivity type of the subsequently withdrawn material.

Figure 1:
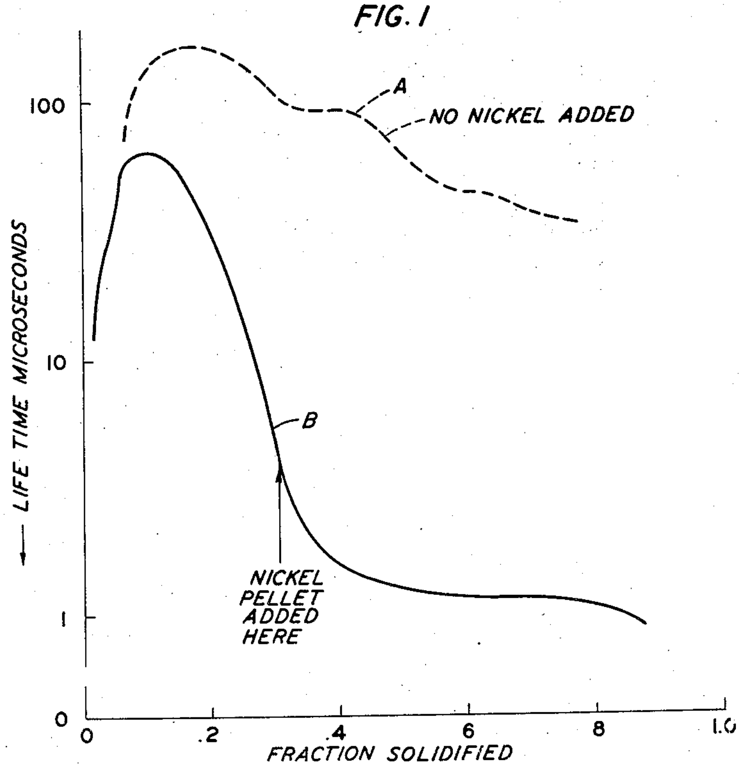
Fig. 1 is a graph showing the effect upon carrier lifetime of the addition of nickel to germanium in one illustrative embodiment of this invention.
Figure 2:
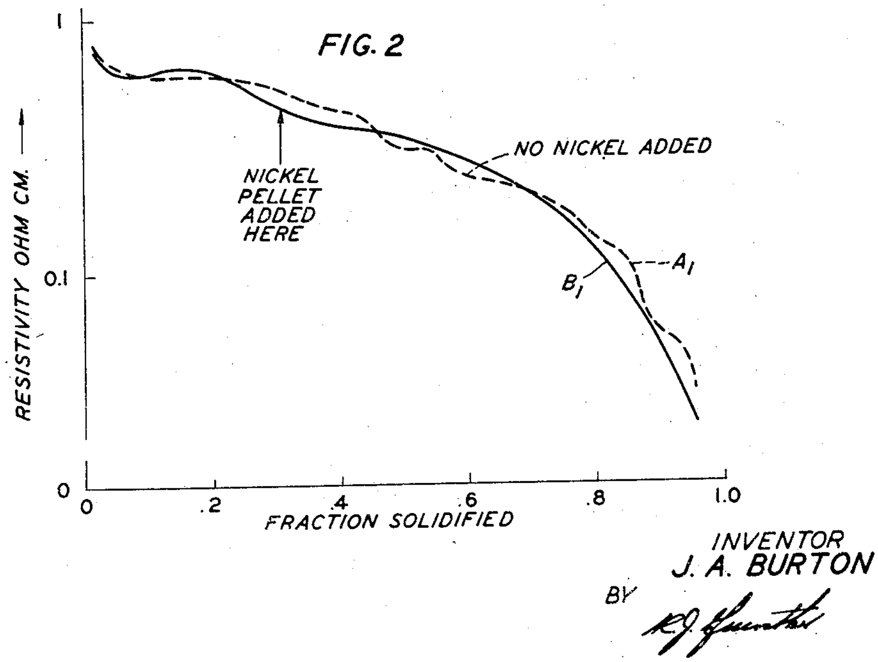
Fig. 2 is a graph showing the absence of substantial effect upon resistivity by the nickel addition in the embodiment represented in Fig. 1.

In the fabrication of material in accordance with this invention, nickel is added to the germanium mass either initially or after a portion of the mass has been withdrawn thereby to control the carrier lifetimes of the entire mass withdrawn or of a desired portion thereof. In the case of the specific embodiment leading to the characteristics depicted in Figs. 1 and 2 a mass of 125 grams of N type germanium was molten, a portion, approximately one half, thereof withdrawn with the seed and then a 0.003 gram pellet of nickel was dropped into the molten mass, the withdrawing continuing without interruption. The point in the procedure at which the nickel was introduced is indicated in Figs. 1 and 2. The concentration of the introduced nickel in the molten mass was 0.005%; the concentration in the subsequently withdrawn material was $5\times10^{-8}\%$. In Fig. 1, curves A and B depict the lifetime characteristics of two single crystals of N type germanium drawn from masses initially identical as measured, at various points along the crystal length, the zero point indicating the seed end or starting point. For the crystal represented by curve A, the material was unaltered during the withdrawing of the molten material whereas for the crystal represented by curve B nickel was added to the molten mass, as above described, at the point indicated. As is evident from these curves, the effect of the nickel addition is to greatly reduce the lifetime, say from of the order of 100 microseconds to about 3 microseconds at the point at which the pellet was added. It will be noted that the nickel adition effected also a marked reduction in the lifetime of the material withdrawn preceding the addition of the pellet to the molt. This is explicable as due to diffusion of nickel from the melt into the previously withdrawn material.

In Fig. 2, curves $A_1$ and $B_1$ represent the resistivity of the same two crystals having the lifetime characteristics portrayed in Fig. 1. As is evident, the nickel addition resulted in no substantial alteration in the resistivity.

Figure 3:
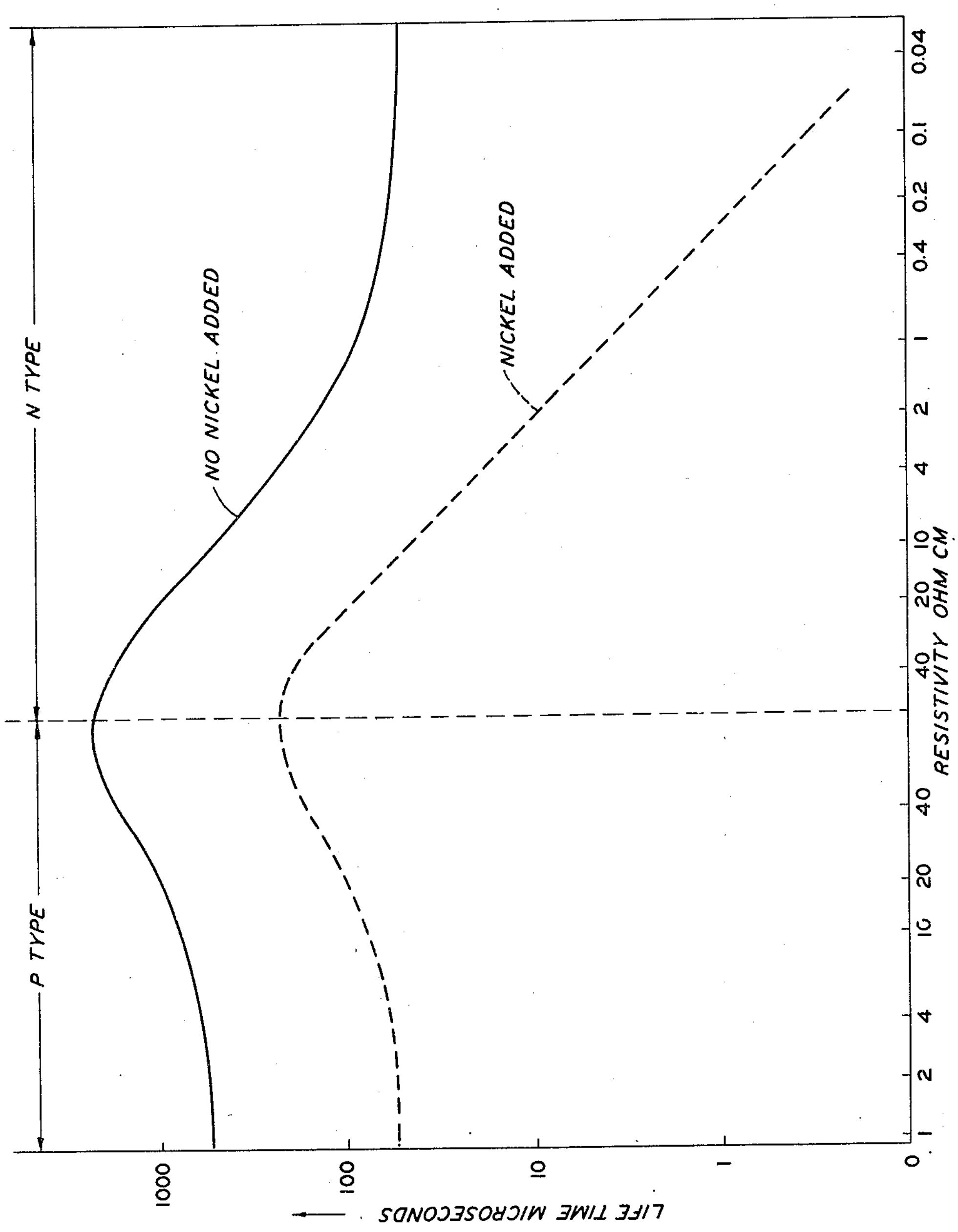
Fig. 3 portrays the effect upon lifetime of nickel additions to germanium of both P and N conductivity types and of various resistivities.

The control of lifetimes by addition of nickel is realizable with both N and P conductivity type germanium and with either type material of any resistivity. This is depicted clearly in Fig. 3 which shows the effect upon lifetime of additions of 0.003 gram nickel to 125 gram melts of N and P type germanium. As is evident, the decrease in carrier lifetime effected is substantially uniform over a wide range of resistivity for both N and P type material.

The decrease in lifetime, it has been found, is dependent upon the concentration of the nickel. Specifically, the concentration of nickel requisite to decrease the lifetime of N or P type material by a factor of 10 is substantially $10^{13}$ atoms/cc. or substantially $2\times10^{-10}$ atom fraction. The decrease in lifetime is substantially linearly proportional to the quantity of nickel added. Thus, for example, a decrease in lifetime of half that indicated in Fig. 3 would result from addition of half as much nickel to the melt, i. e., 0.0015 gram of nickel to 125 grams of germanium.

Further, it has been found that nickel is capable of acting as an acceptor impurity and has an acceptor level of about 0.25 volt above the filled band. This is substantially midway in the energy gap between the filled and conduction bands in germanium. Hence, addition of nickel to germanium in substantial quantities would result in alteration of the resistivity. As has been pointed out hereinabove, addition of nickel in the order of the amounts given results in a many fold decrease in carrier lifetimes with no substantial change in resistivity. In general, in order that this may obtain, i. e., that the lifetime will be altered markedly with no significant change in resistivity, the nickel concentration must be small in comparison to the donor or acceptor concentration. For example, if the donor concentration is about $10^{15}$/cc., nickel additions of about $10^{14}$/cc. would not effect a substantial change in resistivity. It will be appreciated from what has been said hereinabove that even very small nickel additions cause large changes in the carrier lifetimes. In general, nickel additions which result in a nickel concentration of 0.001% or less by weight in the solid germanium material are satisfactory.

Although in the specific embodiment described hereinabove, the nickel is added to the molten mass of germanium, it may be introduced into germanium in other ways. For example, it may be introduced by diffusion thereof from a coating of nickel or a nickel salt on a germanium body. As a specific example, a germanium wafer may be dipped in a solution of nickel sulfate, the solution having an atomic concentration of nickel of about $1:10^{10}$ and the wafer then heated, after removal from the solution, at a temperature of the order of 900° C. to effect diffusion of nickel into the germanium. The diffusion constant for nickel is of the order of $5\times10^{-5}$ cm.$^2$/sec. at about 900° C.

What is claimed is:

1. The method of fabricating a single crystal body essentially of germanium of predetermined length, said body having a substantially uniform resistivity characteristic along said length, said body having a significantly higher injected carrier lifetime characteristic in one portion of said length than the injected carrier lifetime characteristic in the other portion of said length, that comprises adding an amount of nickel not in excess of .001 percent by weight to said other portion during fabrication.

2. The method of fabricating a single crystal body essentially of germanium of predetermined length, said body having a substantially uniform resistivity characteristic along said length, said body having a significantly higher injected carrier lifetime characteristic in one portion of said length than the injected carrier lifetime characteristic in the other portion of said length, that comprises adding to said one portion a conductivity type determining impurity during fabrication and adding to said other portion during fabrication a conductivity type determining impurity and a quantity of nickel not in excess of .001 percent by weight thereby to reduce the injected carrier lifetime in said other portion.

References Cited in the file of this patent

UNITED STATES PATENTS 2,514,879 Lark-Horovitz ---------- July 11, 1950